United States Patent [19]

Azema et al.

[11] Patent Number: 5,610,110

[45] Date of Patent: Mar. 11, 1997

[54] SINTERED SIC SHAPED ARTICLES AND MECHANICAL PACKINGS COMPRISED THEREOF

[75] Inventors: Olivier Azema, Tarbes; Michel Bougoin, Aureilhan, both of France

[73] Assignee: Ceramiques & Composites S.A., Bazet, France

[21] Appl. No.: 442,968

[22] Filed: May 17, 1995

Related U.S. Application Data

[63] Continuation of Ser. No. 137,780, Oct. 19, 1993, abandoned, which is a continuation of Ser. No. 777,920, Oct. 17, 1991, abandoned.

[30] Foreign Application Priority Data

Oct. 17, 1990 [FR] France ................... 90 12783

[51] Int. Cl.$^6$ ............................................. C04B 35/56
[52] U.S. Cl. ................. 501/88; 501/81; 501/82; 501/90
[58] Field of Search ..................... 501/88, 80, 81, 501/82, 84, 90

[56] References Cited

U.S. PATENT DOCUMENTS

| | | | |
|---|---|---|---|
| 4,756,895 | 7/1988 | Boecker et al. | 423/345 |
| 4,777,152 | 10/1988 | Tsukada | 501/88 |
| 4,777,153 | 10/1988 | Sonuparlak et al. | 501/82 |
| 4,957,811 | 9/1990 | Benker et al. | 428/312 |
| 5,080,378 | 1/1992 | Kagawa | 501/88 |
| 5,114,886 | 5/1992 | Tsukada | 501/88 |

FOREIGN PATENT DOCUMENTS

| | | | |
|---|---|---|---|
| 0361326A2 | 9/1989 | European Pat. Off. | |
| 0578408A2 | 1/1994 | European Pat. Off. | |
| 0145075 | 9/1982 | Japan | 501/88 |
| 62-176970 | 6/1985 | Japan | |
| 1083689 | 4/1986 | Japan | 501/88 |
| 1065499 | 4/1986 | Japan | 501/88 |
| 62-270481 | 11/1986 | Japan | |
| 63-221680 | 9/1988 | Japan | |

*Primary Examiner*—Paul Marcantoni
*Attorney, Agent, or Firm*—Burns, Doane, Swecker & Mathis L.L.P.

[57] ABSTRACT

Mechanically strong and reduced friction porous silicon carbide sintered shaped articles, well adapted for the production, e.g., of leaktight mechanical packings and rotating bearing seals, have a total pore volume ranging from 4% to 18% thereof, the pores of which having an average diameter ranging from 40 to 200 μm.

17 Claims, No Drawings

SINTERED SIC SHAPED ARTICLES AND MECHANICAL PACKINGS COMPRISED THEREOF

This application is a continuation of application Ser. No. 08/137,780, filed Oct. 19, 1993, abandoned, which is a continuation of application Ser. No. 07/777,920, filed Oct. 17, 1991, now abandoned.

BACKGROUND OF THE INVENTION

1. Field of the Invention

The present invention relates to sintered silicon carbide shaped articles well adapted for mechanical packing, and to such mechanical packings comprising said sintered shaped articles.

2. Description of the Prior Art

Mechanical packings are well-known fittings comprising two rings rotatably engaged one on the other to form a bearing seal for the rotary shaft of a pump in automobile engines, for example.

Rings fabricated from ceramic materials and, for example, from combinations of sintered silicon carbide for one ring and a carbon-based material, in particular graphite, for the counter-ring, are increasingly being used to manufacture these packings.

A significant problem for this type of material is the wear on the frictionally engaged rings. Indeed, if the wear is too pronounced, there is a risk of surface splintering, in particular of the carbon-based counter-ring.

Irregularities or defects may also be created on this same surface, the flatness of which will thus be reduced.

The consequence of such surface defects is, of course, a reduction in the leaktightness of the system and resulting leakage of liquid.

SUMMARY OF THE INVENTION

A major object of the present invention is the provision of improved silicon carbide material that is well adapted for the production of mechanical packings therefrom, such mechanical packings having enhanced resistance to wear, very particularly at high speeds of rotation.

Briefly, the present invention features sintered shaped articles based on or comprising silicon carbide, the pores of which having an average diameter ranging from 40 to 200 µm and having a total pore volume ranging from 4% to 18%.

DETAILED DESCRIPTION OF THE PREFERRED EMBODIMENTS OF THE INVENTION

More particularly according to the present invention, after extended duration tests (1,000 hours) and at high speeds of rotation, a very good leaktightness of mechanical packings produced from such sintered shaped articles has been demonstrated.

The sintered shaped article or body of the invention is based on silicon carbide (SIC). It is possible to use α-SiC or β-SiC, or combinations of these two polytypes in any proportions.

It will of course be appreciated that the composition of the sintered shaped article may contain, in addition to the SiC, any one or more of the customary and well-known sintering additives, such as, for example, carbon, boron and aluminum.

The present invention also comprehends sintered shaped articles of the composite type, namely, comprising SiC and, in addition, elemental carbon, in particular in the graphite state.

Thus, the present invention includes, for example, composites comprising up to 48% by weight of free carbon, in particular up to 20% and more particularly up to 10%, it being possible for such carbon to be in the form of a mixture of amorphous carbon/graphite carbon in any proportions.

These shaped articles of composite type based on graphite are particularly valuable because they possess improved lubricant properties as a result of the reduction in the coefficient of friction.

Finally, the sintered body is based on a SiC which has a particle size generally ranging from 1 to 500 µm and preferably from 1 to 20 µm.

One of the principal characteristics of the sintered SiC shaped article according to the invention is that it is a porous body having a very specific average pore diameter.

The average diameter is that obtained on the basis of values measured by examination using an electron scanning microscope.

According to the present invention, this diameter must range from 40 to 200 µm.

It has been determined that with an average pore diameter of less than 40 µm, great wear was observed, at least on the counter-ring of the mechanical packing.

Moreover, with an average diameter of more than 200 µm, the pores become too large and the sintered shaped body exhibits reduced mechanical strength.

In general, it is preferable to have a maximum value of the pore diameter of 150 µ, and thus to range from 40 to 150 µm.

It can also be advantageous to have an average pore diameter of at least 50 µm, and more particularly of at least 60 µm. It is for this reason that, according to various embodiments of the invention, sintered shaped bodies having an average pore diameter ranging from 50 to 200 µm, and more particularly from 60 to 200 µm, or from 50 to 150 µm and preferably from 60 to 150 µm and more preferably from 60 to 100 µm are envisaged.

The pores of the shaped body according to the invention are of a spherical shape or of a shape close to a sphere. This shape permits high porosities to be achieved, while ensuring complete leaktightness of the shaped article.

On the other hand, these pores are essentially closed pores.

The porosity of the sintered shaped body according to the invention ranges from 4% to 18%.

This is intended to be the total porosity, namely, that taking account of the open and closed pores. This porosity (P) is given by the equation:

$$P = 100 - d\left[\frac{x}{2.25} + \frac{100-x}{3.21}\right]$$

wherein d is the apparent mass per unit volume of the body and x is the percentage by mass of free carbon contained in the material; 2.25 is the mass per unit volume of the free carbon and 3.21 that of the silicon carbide.

If the porosity is less than 4%, the resulting SiC body does not improve the wear resistance of the mechanical packing. Above 18%, leaktightness is no longer ensured and the mechanical strength is also too low.

Preferably, this porosity ranges from 5% to 15% and more particularly from 8% to 15%, The sintered shaped body of the invention may be produced by a process which entails adding a pore-forming material in the form of microbeads or granules to the mixture of products intended for the preparation of the sintered silicon carbide.

The pore-forming material may be used in a variety of ways. For example, a slip based on SiC, sintering additives and a binder in water or in an organic solvent may be formed in a ball mill. The pore-forming material is then added to this slip, with stirring. Finally, the produced is dried by spraying.

Another process comprises forming and then drying a slip of the type described above, but without the pore-forming material. The pore-forming material is then mixed dry with the dry product thus obtained.

The pore-forming materials which can be used are well known to this art. They are, in general, organic materials of the polymer type. Products obtained from an emulsion polymerization are preferably used. These materials must not be soluble in water or the organic solvent present in the composition of the slip. They must also be able to thermally withstand drying, in particular by spraying.

Exemplary thereof are polystyrene, polymethyl methacrylate and polyamide.

The dried product obtained is finally shaped, for example by isostatic or uniaxial pressing, to provide a green article. Shaping may also be carried out by casting or extrusion.

This green article is then sintered in a manner known per se.

In general, the sintering temperature ranges from 1,900° to 2,500° C. and more preferably from 2,000° to 2,200° C. Sintering is carried out under vacuum and/or under an atmosphere of a gas of the argon, carbon monoxide or carbon dioxide, helium, hydrogen or nitrogen type, for example.

The present invention also features the mechanical packings comprising a fixed ring and a rotary ring, at least one of which comprises the sintered shaped body as described above.

The other ring may be produced from a carbon-based material and, in particular, resin-impregnated carbon. This material may also comprise silicon carbide or silicon nitride; it may also be a sintered alumina shaped body. It may also be a material of metallic type, for example carbon steel.

Finally, it is possible to use a packing in which the two rings comprise the sintered shaped body according to the invention.

The sintered body of the invention may also be used in bearings.

Of course, the sintered shaped articles of the invention may be used for applications other than mechanical packings.

Thus, they may be used in any friction system of, for example, the thrust block, bearing or slide type including at least one friction surface comprising said body or part of which comprises said body. It may thus be used, for example, in bearings and in the following configurations: SiC bore—metal shaft, SiC bore—SiC shaft, SiC bore—metal shaft with SiC or graphite casing.

In order to further illustrate the present invention and the advantages thereof, the following specific examples are given, it being understood that same are intended only as illustrative and in nowise limitative.

EXAMPLE 1

Preparation of the ring members:

Two slips were formed containing 60% solids in water comprising inorganic materials, a phenolic resin providing carbon after pyrolysis and 3% of polyethylene glycol.

The proportions of the components of the slips were as follows, in parts by weight:

|  | Slip 1 | Slip 2 |
| --- | --- | --- |
| SiC | 99 | 99 |
| B | 1 | 1 |
| Pore forming agents |  |  |
| PLEXIGUM M 914 | 6 | — |
| ORGASOL 2002 ES 3 | — | 1.6 |
| Carbon (supplied from resin) | 1.5 | 1.5 |

PLEXIGUM M 914 was a polymethyl methacrylate having an average particle size of 90 μm, ORGASOL 2002 ES 3 was a polyamide having an average particle size of 30 μm. The SiC had a surface area of 12 m$^2$/g and an average diameter of 1.3 μm.

The pore-forming agents were mixed with the slip with stirring.

The slips were then dried by spraying.

The powders obtained were then compressed at 1,500 bar to produce green parts. After a heat treatment under nitrogen at a temperature of up to 600° C., which, in particular, permitted the removal of the pore-forming agent, such green parts were then sintered at 2,070° C. under argon for 1 hour.

A ring 1 (resulting from the first slip) according to the invention and a ring 2 (resulting from the second slip) produced for purposes of comparison were obtained. The characteristics of these elements are reported below.

| Ring | 1 | 2 |
| --- | --- | --- |
| Total porosity (%) | 14.3 | 5.3 |
| Average pore diameter (μm) | 80 | 25 |
| Apparent mass per unit volume (g/cm$^3$) | 2.75 | 3.04 |

EXAMPLE 2

A slip was formed containing 60% solids in water comprising inorganic materials, a phenolic resin providing carbon after pyrolysis, 3% of polyethylene glycol and a pore-forming agent PLEXIGUM M 820.

The ratios of the components of the slip were as follows, in parts by weight:

| SiC | 96.37 |
| --- | --- |
| B$_4$C | 0.63 |
| Graphitic carbon | 3.00 |
| Pore forming agent | 4.1 |
| Carbon (supplied from resin) | 1.5 |

PLEXIGUM M 280 was a polymethyl methacrylate having an average particle size of 75 μm.

The graphite was the KS6 grade marketed by LONZA, having a surface area of 20 m$^2$/g and an average diameter of about 3.5 μm.

The SiC was the same as in Example 1.

The pore-forming agent was mixed with the slip with stirring.

The slip was dried by spraying.

The powder obtained was then compressed at 1,500 bar to produce a green part. After a heat treatment under nitrogen at 600° C., which permitted the removal of the pore-forming agent and the conversion of the resin to carbon, the green part was then sintered at 2,070° C. under argon for 1 hour.

A composite material, α-SiC/graphite, was produced, the characteristics of which are reported below:

| | |
|---|---|
| Total porosity (%) | 10.7 |
| Average pore diameter (μm) | 65 |
| Apparent mass per unit volume (g/cm³) | 2.83 |
| Theoretical apparent mass per unit volume without porosity (g/cm³) | 3.17 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A porous silicon carbide sintered shaped article having a total pore volume ranging from 4% to 18% thereof, the pores of which being essentially spherical in shape, essentially closed and having an average diameter ranging from greater than 50 to 200 μm.

2. The sintered shaped article as defined by claim 1, the pores of which having an average diameter ranging from greater than 50 to 150 μm.

3. The sintered shaped article as defined by claim 1, the pores of which having an average diameter ranging from 60 to 200 μm.

4. The sintered shaped article as defined by claim 2, the pores of which having an average diameter ranging from 60 to 150 μm.

5. The sintered shaped article as defined by claim 4, the pores of which having an average diameter ranging from 60 to 100 μm.

6. The sintered shaped article as defined by claim 1, having a total pore volume ranging from 5% to 15% thereof.

7. The sintered shaped article as defined by claim 6, having a total pore volume ranging from 8% to 15% thereof.

8. The sintered shaped article as defined by claim 1, comprising α-SiC.

9. The sintered shaped article as defined by claim 1, comprising β-SiC.

10. The sintered shaped article as defined by claim 1, comprising elemental carbon.

11. The sintered shaped article as defined by claim 10, comprising graphitic carbon.

12. The sintered shaped article as defined by claim 10, comprising up to 48% by weight of elemental carbon.

13. The sintered shaped article as defined by claim 12, comprising up to 20% by weight of elemental carbon.

14. The sintered shaped article as defined by claim 13, comprising up to 10% by weight of elemental carbon.

15. The sintered shaped article as defined by claim 1, comprising a sintering additive.

16. The sintered shaped article as defined by claim 1, produced from SiC particulates having a particle size ranging from 1 to 500 μm.

17. The sintered shaped article as defined by claim 16, produced from SiC particulates having a particle size ranging from 1 to 20 μm.

* * * * *